United States Patent [19]

Letton et al.

[11] Patent Number: 5,306,516
[45] Date of Patent: * Apr. 26, 1994

[54] SHORTENING COMPOSITIONS CONTAINING POLYOL FATTY ACID POLYESTERS

[75] Inventors: James C. Letton, Forest Park; Joseph J. Elsen, Cincinnati; Timothy B. Guffey; Jeffrey K. Kester, both of West Chester; David J. Weisgerber, Cincinnati, all of Ohio

[73] Assignee: The Procter & Gamble Company, Cincinnati, Ohio

[*] Notice: The portion of the term of this patent subsequent to Aug. 17, 2010 has been disclaimed.

[21] Appl. No.: 85,467

[22] Filed: Jun. 30, 1993

Related U.S. Application Data

[63] Continuation of Ser. No. 755,254, Sep. 5, 1991, abandoned, which is a continuation of Ser. No. 514,793, Apr. 26, 1990, abandoned.

[51] Int. Cl.$^5$ ................................................ A23L 1/00
[52] U.S. Cl. ................................... 426/531; 426/601; 426/804; 536/119
[58] Field of Search ............... 426/531, 601, 603, 606, 426/607, 611, 612, 804; 536/119

[56] References Cited

U.S. PATENT DOCUMENTS

| | | |
|---|---|---|
| 2,962,419 | 11/1960 | Minnich . |
| 3,093,481 | 6/1963 | Eckey et al. . |
| 3,158,490 | 11/1964 | Baur et al. . |
| 3,579,548 | 5/1971 | Whyte . |
| 3,600,186 | 8/1971 | Mattson et al. ............... 426/611 |
| 3,649,647 | 3/1972 | Ota et al. . |
| 3,932,532 | 1/1976 | Hunter et al. . |
| 3,963,699 | 6/1976 | Rizzi et al. . |
| 4,005,195 | 1/1977 | Jandacek . |
| 4,005,196 | 1/1977 | Jandacek . |
| 4,034,083 | 7/1977 | Mattson . |
| 4,368,213 | 1/1983 | Hollenbeck et al. . |
| 4,461,782 | 7/1984 | Robbins et al. . |
| 4,508,746 | 4/1985 | Hamm . |
| 4,517,360 | 5/1985 | Volpenhein . |
| 4,518,772 | 5/1985 | Volpenhein . |
| 4,582,715 | 4/1986 | Volpenhein . |
| 4,582,927 | 4/1986 | Fulcher . |
| 4,797,300 | 1/1989 | Jandacek . |
| 4,840,815 | 6/1989 | Meyer et al. . |
| 4,861,613 | 8/1989 | White et al. . |
| 4,880,657 | 11/1989 | Guffey et al. . |
| 4,888,195 | 12/1988 | Huhn et al. . |
| 4,940,601 | 7/1990 | Orphanos et al. ............... 426/601 |
| 5,236,733 | 8/1993 | Zimmerman et al. ............... 426/611 |

FOREIGN PATENT DOCUMENTS

| | | |
|---|---|---|
| 233856 | 8/1967 | European Pat. Off. . |
| 236288 | 9/1987 | European Pat. Off. . |
| 290065 | 11/1988 | European Pat. Off. . |
| 290420 | 11/1988 | European Pat. Off. . |
| 0290421 | 11/1988 | European Pat. Off. . |
| 311154 | 4/1989 | European Pat. Off. . |
| 0322027 | 6/1989 | European Pat. Off. . |
| 227137 | 9/1985 | German Democratic Rep. . |
| 49-26220 | 3/1974 | Japan . |
| 58-78531 | 5/1983 | Japan . |
| 59-143550 | 8/1984 | Japan . |
| 59-156242 | 9/1984 | Japan . |
| 63-78550 | 6/1989 | Japan . |

*Primary Examiner*—Donald E. Czaja
*Assistant Examiner*—Leslie Wong
*Attorney, Agent, or Firm*—Eric W. Guttag; Ronald L. Hemingway; Tara M. Rosnell

[57] ABSTRACT

Reduced fat and calorie plastic shortenings are disclosed. The nondigestible portion of these compositions contain low levels of solids, yet still exhibit good passive oil loss control. These compositions also impart good organoleptic properties to foods prepared with them. These shortenings comprise specific solid polyol fatty acid polyesters, a liquid nondigestible oil, and, optionally, a hardstock, a digestible oil, an intermediate melting triglyceride, or other shortening ingredients.

31 Claims, No Drawings

SHORTENING COMPOSITIONS CONTAINING POLYOL FATTY ACID POLYESTERS

This is a continuation of application Ser. No. 07/755,254, filed on Sep. 5, 1991 now abandoned, which is a continuation of application Ser. No. 07/514,793, filed on Apr. 26, 1990 now abandoned.

FIELD OF THE INVENTION

The present invention relates to improved, nondigestible or reduced calorie plastic shortenings. These shortening compositions contain a liquid nondigestible oil and specific solid polyol fatty acid polyesters, and, optionally, a hardstock, a digestible oil, an intermediate melting fraction triglyceride, or other shortening ingredients.

BACKGROUND ART

In recent years considerable attention has been focused on the amount of triglyceride fat in the diet from the standpoint of health concerns about obesity and hypercholesterolemia. Numerous patents have been directed to providing materials which have the physical and gustatory characteristics of triglyceride fats, but which are absorbed to a low extent or not at all by the body. These materials are referred to variously as noncaloric fats, pseudofats, nondigestible fats and fat substitutes. Patents pertaining to such materials include U.S. Pat. No. 4,582,927, Fulcher, issued Apr. 15, 1986, (fatty esters of malonic acid); U.S. Pat. No. 4,582,715, Volpenhein, issued Apr. 15, 1986, (alpha acetylated triglycerides); and U.S. Pat. No. 3,579,548, Whyte, issued May 18, 1971, (triglycerides of alpha-branched chain carboxylic acids)

One particular type of compound which has achieved considerable attention as a nondigestible fat is sucrose polyester (i.e., sucrose in which at least four of the eight hydroxyl groups are esterified with a fatty acid). U.S. Pat. No. 3,600,186, Mattson, issued Aug. 17, 1971; U.S. Pat. No. 4,368,213, Hollenbach et al. issued Jan. 11, 1983; and U.S. Pat. No. 4,461,782, Robbins et al. issued Jul. 24, 1984 describe the use of this material as a nondigestible fat in a variety of food compositions.

A problem associated with use of liquid nondigestible oils, i.e., those having a melting point below body temperature (about 37° C.), is an undesired passive oil loss effect, (hereinafter "oil loss") which is manifested in leakage of the liquid nondigested fat through the gastrointestinal tract's anal sphincter. Regular ingestion of moderate to high levels of completely liquid forms of these polyol polyesters can produce this passive oil loss. U.S. Pat. No. 4,005,195, Jandacek, issued Jan. 25, 1977, discloses the combining of higher melting fatty materials such as solid triglycerides and solid sucrose polyesters with the liquid sucrose polyesters in order to control oil loss.

U.S. Pat. No. 4,797,300 (Jandacek et al.), issued Jan. 10, 1989 discloses the use of certain solid sucrose polyesters which have high oil binding capacity for liquid sucrose polyesters (SPE) and liquid triglycerides, when used at levels of about 10% to 25% in said oils. It is disclosed that because of their high oil binding capacity, these solid sucrose polyesters have outstanding utility as agents to control passive oil loss of liquid nondigestible sucrose polyesters, and they are also useful as non-caloric hardstocks to use with liquid digestible or nondigestible oils in the preparation of semi-solid fat products such as shortenings and margarines. The oil binding agents of the Jandacek et al. '300 patent are solid sucrose polyesters wherein the ester groups consist essentially of a mixture of short chain saturated fatty acid ester radicals ($C_2$-$C_{10}$) and long chain saturated fatty acid radicals ($C_{20}$-$C_{24}$) in a molar ratio of short chain to long chain of from about 3:5 to about 5:3, and wherein the degree of esterification is from about 7 to about 8. Jandacek et al. also disclose plastic shortening and other food compositions containing 10-25% of the solid SPE.

U.S. Pat. No. 4,005,195 (Jandacek), issued Jan. 25, 1977 describes a means of preventing the undesirable oil loss effect through the addition of oil-loss control agents. The oil-loss control agents include solid fatty acids (melting point 37° C. or higher) and their triglyceride sources, and solid polyol fatty acid polyesters. Specifically $C_{10}$-$C_{22}$ saturated fatty acid polyesters are said to be useful at levels of at least 10%, preferably at least 20%.

U.S. Pat. No. 3,158,490 (Baur et al.), issued Nov. 24, 1964 discloses sucrose (and other disaccharide) polyesters which are useful as additives at 0.001% to 0.5% level in triglyceride salad oils to prevent clouding in low-temperature storage of the oils. The degree of esterification is at least 3, i.e., no more than 5 of the 8 hydroxyl groups are unesterified. The ester groups are a combination of: (1) from 15-85% saturated $C_{14}$-$C_{22}$ fatty acids, and (2) the balance selected from saturated $C_2$-$C_{12}$ or unsaturated $C_{14}$-$C_{22}$ fatty acids. Arachidic ($C_{20}$) and behenic ($C_{22}$) acids are recited as specific examples of (1) and acetic ($C_2$), caprylic ($C_8$), and oleic ($C_{18-1}$) acids are recited as specific examples of (2). At col. 2, lines 5-10, a sucrose ester having 2 oleic and 6 palmitic groups is disclosed, and it is stated that long chain saturated acids such as myristic, stearic, arachidic or behenic can be used in place of all or part of the palmitic.

U.S. Pat. No. 3,093,481 (Eckey et al.) issued Jun. 11, 1963 describes sucrose polyesters which are used at up to about 0.5% in shortenings to improve the physical aging characteristics of the shortening. The saccharides can be sucrose, lactose, maltose, etc. At least half of the hydroxyl groups are esterified with saturated $C_{14}$-$C_{22}$ acids. The remaining hydroxyl groups can be esterified with $C_2$-$C_{12}$ saturated acids and/or $C_{14}$-$C_{22}$ unsaturated acids.

U.S. Pat. No. 4,880,657 (Guffey et al.), issued Nov. 14, 1989 discloses plastic shortening made with Intermediate Melting Fraction (IMF) polyol polyesters in combination with triglyceride hardstock and triglyceride oils. The solid fat content profile and penetration of the disclosed shortenings are adjusted to provide improved textural qualities to the shortening. Examples of IMF materials with the following fatty acid contents are disclosed: (1) 11.5% $C_{16}$, 54.2% $C_{18}$, 17.9% $C_{18:1}$, 14.2% $C_{18:2}$, 1% $C_{18:3}$, 0.5% $C_{20}$, and 0.3% $C_{22}$; and (2) 9.6% $C_{16}$, 50.6% $C_{18}$, 21.6% $C_{18:1}$, 15.7% $C_{18:2}$, 1% $C_{18:3}$, 0.5% $C_{20}$ and 0.3% $C_{22}$.

While these references disclose shortenings and oil which provide oil loss control, none of the references recognizes that oil loss control and good organoleptic properties can be achieved when the nondigestible portion of a reduced calorie shortening/oil has low solids levels (i.e. less than 10%).

It is, therefore, an object of the present invention to provide reduced calorie plastic shortenings which impart oil-loss leakage control, good textural properties, and also provide good organoleptic properties to foods prepared with them.

These and other objects of the invention will become evident from the disclosure herein.

SUMMARY OF THE INVENTION

Plastic shortening compositions of the present invention contain: (A) a solid polyol fatty acid polyester having a complete melting point above 37° C. wherein (i) the polyol has at least about 4 hydroxyl groups, (ii) the ester groups are comprised of (a) fatty acid radicals selected from the group consisting of $C_{12}$ or higher unsaturated fatty acid radicals, $C_2$–$C_{12}$ saturated fatty acid radicals, or mixtures thereof, and (b) $C_{20}$ or higher saturated fatty acid radicals at a molar ratio of a:b being from about 1:15 to about 2:1, and (iii) at least 4 of the hydroxyl groups of the polyol are esterified; (B) a liquid nondigestible oil having a complete melting point below about 37° C.; (C) less than about 90% by weight of a digestible oil having an iodine value between about 75 and about 150; (D) less than about 50% intermediate melting fraction triglyceride having an iodine value between about 25 and about 75; (E) less than about 20% by weight hardstock; and (F) from 0% to about 15% by weight other shortening ingredients; wherein the ratio of (A) to (B) is from about 1:99 to about 9:91, wherein the shortening composition has a yield point more than about 100 dynes/cm$^2$, wherein the combined level of (A) and (B) is greater than 10%, wherein at least 15% by weight of the fatty acid radicals in (A) are $C_{20}$ or higher saturated fatty acid radicals and wherein the slope of the SFC profile of the mixture of (A) and (B) between 37° C. and 21.1° C. is between 0 and about $-0.75$.

DEFINITIONS

As used herein the term "nondigestible" shall mean being absorbable to an extent of only 70% or less (especially 20% or less) by the human body through its digestive system.

As used herein the terms "hardstock" and "hardstock fat" refer to triglycerides and/or polyol fatty acid polyesters having an iodine value of less than about 12. As used herein, "hardstock" does not include the solid polyol fatty acid polyesters described in section A, below.

As used herein, the term "plastic" shortening defines a semi-solid or solid, non-fluid, and non-pourable shortening at possible storage temperatures (i.e. from about 10° C. to about 41° C.). Said shortening must have a yield point high enough to prevent product flow at room temperature (greater than about 100 dynes/cm$^2$), that is, it must be sufficiently solid to prevent product deformation under its own weight after tilting from the upright position for about 5 seconds, in packages containing ordinary commercial unit quantities.

Also as used herein, the terms "beta-prime-phase-tending", "beta-prime-tending" and "$\beta'$-tending" define an overall tendency of certain solids to crystallize in the beta-prime phase. This does not mean, however, that under proper conditions triglyceride solids cannot be transformed from a beta-prime phase to another phase, like beta. The types of polymorphic crystalline structures of fats can be identified by their X-ray diffraction patterns and are described in U.S. Pat. Nos. 2,521,241 and 2,521,242, granted to Paul J. Mitchell, Jr., Sep. 5, 1950, incorporated herein by reference. The preferred plastic shortenings of the present invention have some portion of their solid crystals in the beta-prime phase, particularly when stored under normal conditions, e.g., 20° C. to 38° C.

As used herein, the terms "food" and "comestible" refer to any manner of viand for usage by man. "Food" and "Comestible" may further include individual food components or mixtures thereof.

As used herein "digestible triglyceride fat or oil" shall mean triglyceride fat or oil that is substantially completely digested by the body. Typically, at least about 90% of such triglyceride fats or oils are digested.

The term "iodine value", often seen as I.V., is well known in oil technology and refers to the amount of iodine that will add to the unsaturated bonding of a 100 gram sample of any oil or oil-like material that contains fatty acids. The higher the iodine value the higher the degree of unsaturation, and conversely the lower the iodine value the lower the degree of unsaturation. Also, in general the higher the iodine value the lower the melting point of the material, and the lower the iodine value the higher the melting point of the material. Iodine value is measured by the standard Wijs titration.

All percentages and proportions herein are "by weight" unless otherwise specified.

DETAILED DESCRIPTION OF THE INVENTION

It has been found that nondigestible and reduced calorie plastic shortenings which contain low levels of specific narrowly defined nondigestible solid polyol fatty acid polyester in combination with a nondigestible oil component (typically at a nondigestible solid:liquid ratio of from about 1:99 to 9:91) have improved oil loss characteristics. These compositions can optionally contain a hardstock, digestible oils, intermediate melting fraction triglyceride or other shortening ingredients.

Furthermore, where the composition has a beta-prime-tending crystal structure, the plastic shortening exhibits excellent textural characteristics.

The details of the present, improved shortening compositions are more completely discussed below:

A. Solid Polyol Fatty Acid Polyester Components

The solid polyol fatty acid polyesters of the present invention are polyol polyesters wherein the ester groups comprise a combination of: (a) long chain, unsaturated fatty acid radicals, short chain saturated fatty acid radicals, or mixtures thereof, and (b) long chain saturated fatty acid radicals, the ratio of (a):(b) being from about 1:15 to about 2:1, and wherein at least about 15% (preferably at least about 30%, more preferably at least about 50%, and most preferably at least about 60%) by weight of the total fatty acid radicals in the solid polyol polyester are $C_{20}$ or higher saturated fatty acid radicals. The long chain unsaturated fatty acid radicals are typically straight chain (i.e., normal) and contain at least about 12 (preferably about 12 to about 26, more preferably about 18 to 22, and most preferably 18 mono- and di- unsaturates) carbon atoms. The short chain saturated fatty acid radicals are typically normal and contain 2 to 12 (preferably 6 to 12 and most preferably 8 to 12) carbon atoms. The long chain saturated fatty acid radicals are typically normal and contain at least 20 (preferably 20 to 26, most preferably 22) carbon atoms. The molar ratio of Group (a) fatty acid radicals to Group (b) fatty acid radicals in the polyester molecule is from about 1:15 to about 2:1 (preferably about 1:7 to about 5:3, more preferably about 1:7 to about 3:5).

The average degree of esterification of these solid polyol fatty acid polyesters is such that at least 4 of the hydroxyl groups of the polyol are esterified. In the case of sucrose polyesters from about 7 to 8 of the hydroxyl groups of the polyol are preferably esterified. Typically, substantially all (e.g., at least about 85%, preferably at least about 95%) of the hydroxyl groups of the polyol are esterified.

The polyols which are used in the solid polyol polyester compounds of the present invention preferably contain from about 4 to about 11 (more preferably 4 to 8, most preferably 6 to 8) hydroxyl groups.

Examples of preferred polyols are sugars (including monosaccharides and disaccharides and trisaccharides) and sugar alcohols, containing from 4 to 11 hydroxyl groups. The trisaccharides raffinose and maltotriose are examples of sugars which contains 11 hydroxyl groups. The preferred sugars and sugar alcohols are those which contain 4 to 8 (more preferably 6 to 8) hydroxyl groups. Examples of those containing four hydroxyl groups are the monosaccharides xylose and arabinose and the sugar alcohol erythritol. Suitable five hydroxyl group-containing polyols are the mono-saccharides galactose, fructose, mannose and glucose, and the sugar alcohol xylitol. A polyol containing six hydroxyl groups is sorbitol. Examples of disaccharide polyols which can be used include maltose, lactose, and sucrose, all of which contain eight hydroxyl groups. Examples of other suitable polyols are pentaerythritol, diglycerol, triglycerol, alkyl glycosides, and polyvinyl alcohols. The preferred polyol is sucrose.

Examples of suitable Group (a) long chain unsaturated fatty acid radicals for the solid polyol polyesters herein are lauroleate, myristoleate, palmitoleate, oleate, elaidate, erucate, linoleate, linolenate, arachidonate, eicosapentaenoate, and docosahexaenoate. For oxidative stability, the mono- and/or diunsaturated fatty acid radicals are preferred. Examples of suitable short chain saturated fatty acid radicals are acetate, caproate, caprylate, caprate, and laurate.

Examples of suitable Group (b) long chain saturated fatty acid radicals are arachidate, behenate, lignocerate and cerotate.

Of course, the Group (a) fatty acid radicals can be used singly or in mixtures with each other in all proportions. Likewise, the long chain saturated radicals can be used in combination with each other in all proportions. Mixed fatty acid radicals from source oils which contain substantial amounts of the desired unsaturated or saturated acids can be used as the fatty acid radicals to prepare compounds of the invention. The mixed fatty acid radicals from the oils should contain at least about 30% (preferably at least about 50%, most preferably at least about 80%) of the desired unsaturated or saturated acids. For example, rapeseed oil fatty acid radicals or soybean oil fatty acid radicals can be used instead of pure $C_{12}$–$C_{26}$ unsaturated fatty acids. Hardened (i.e., hydrogenated) high erucic rapeseed oil fatty acids can be used instead of pure $C_{20}$–$C_{26}$ saturated acids. Preferably the $C_{20}$ and higher acids (or their derivatives—e.g. methyl esters) are concentrated; for example by distillation. The fatty acids from palm kernel oil or coconut oil can be used as a source of $C_8$–$C_{12}$ fatty acids.

The fatty acids from palm kernel oil or coconut oil can be used as a course of $C_8$ to $C_{12}$ acids. An example of the use of source oils to make solid polyol polyesters of the invention is the preparation of solid sucrose polyester, employing the fatty acids of high oleic sunflower oil and substantially completely hydrogenated high erucic rapeseed oil. When sucrose is substantially completely esterified with a 1:3 by weight blend of the methyl esters of the fatty acids of these two oils, the resulting sucrose polyester will have a molar ratio of unsaturated $C_{18}$ acid radicals to $C_{20}$ and higher saturated acid radicals of about 1:1 and 28.6 weight percent of the total fatty acids in the polyester will be $C_{20}$ and $C_{22}$ fatty acids.

The higher the proportions of the desired unsaturated and saturated acids in the fatty acid stocks used in making the solid polyol polyester, the more efficient the ester will be in its ability to bind liquid oils.

The preferred unsaturated fatty acid radicals are those which have 18 carbon atoms and are mono- and/or diunsaturated. Preferred short chain fatty acid radicals are those which have 8–12 carbon atoms. The preferred long chain saturated fatty acid radical is behenate. The preferred ratio of Group (a) fatty acid radicals to Group (b) fatty acid radicals is from about 1:7 to about 5:3 (preferably 1:7 to 3:5). Preferred solid polyol polyesters of the invention are polyesters of sucrose in which at least 7 of the 8 hydroxyl groups are esterified.

Examples of solid polyol polyesters of the present invention are sorbitol hexaester in which the acid ester radicals are palmitoleate and arachidate in a 1:2 molar ratio; the octaester of raffinose in which the acid ester radicals are linoleate and behenate in a 1:3 molar ratio; the heptaester of maltose wherein the esterifying acid radicals are sunflower seed oil fatty acids and lignocerate in a 3:4 molar ratio; the octaester of sucrose wherein the esterifying acid radicals are oleate and behenate in a 2:6 molar ratio; and the octaester of sucrose wherein the esterifying acid radicals are laurate, linoleate and behenate in a 1:3:4 molar ratio. A preferred material is sucrose polyester in which the degree of esterification is 7–8, and in which the fatty acid radicals are $C_{18}$ mono- and di- unsaturated and behenic, in a molar ratio of 2:6.

The solid polyol polyesters used in the present invention can be made according to prior known methods for preparing polyesters of polyols. Since the sucrose polyesters are the preferred solid polyol polyesters herein, the invention will be exemplified primarily by these materials. One such method of preparation is by reacting the acid chlorides of the fatty acids with sucrose. In this method a mixture of the acid chloride or acid anhydride of the fatty acids can be reacted in one step with sucrose, or the acid chlorides can be reacted sequentially with sucrose. Another preparation method is by the process of reacting methyl esters of the fatty acids with sucrose in the presence of a fatty acid soap and a basic catalyst such as potassium carbonate. See, for example, U.S. Pat. No. 3,963,699, Rizzi et al., issued Jun. 15, 1976; U.S. Pat. No. 4,518,772, Volpenhein, issued May 21, 1985; and U.S. Pat. No. 4,517,360, Volpenhein, issued May 14, 1985, and U.S.S.N. 417,990, Letton, filed Oct. 6, 1989, all incorporated herein by reference.

When using the methyl ester route for preparing the solid polyol polyesters herein, the fatty acid methyl esters are blended in the desired ratio and reacted with sucrose by transesterification to obtain the sucrose esters of mixed unsaturated/saturated or saturated fatty acids. In a preferred way of practicing the methyl ester process, five moles of the blended saturated/unsaturated or saturated methyl esters are reacted with sucrose in a first stage at 135° C. to obtain partial esters of sucrose. An additional nine moles of the blended esters are then added and the reaction continued at 135° C. under reduced pressure until the desired degree of esterification has been attained.

The solid polyol polyesters used in the present invention have complete melting points above 37° C., preferably above about 50° C. and most preferably above about 60° C. (Unless otherwise specified, all complete melting points reported herein are measured according to the method described below.)

B. Liquid Nondigestible Oil Components

The solid polyol fatty acid polyester materials of the present invention have the ability to trap large amounts of oil within their crystal structure. As a consequence, they can be blended in rather small amounts (i.e., as low as about 1%) with liquid nondigestible oils (i.e., those having complete melting points below about 37° C., preferably below about 21° C.) in order to trap the oils and thereby control passive oil loss upon ingestion of food compositions containing the nondigestible oil.

The solid polyol fatty acids described above can be blended at levels of from about 1% to about 9% with these nondigestible oil components, or more precisely, the ratio of solid polyol fatty acids to nondigestible oil in the present shortening compositions can range from about 1:99 to about 9:91.

Mixtures of solid polyol polyesters of the invention with liquid nondigestible oils are further characterized in having a relatively flat solids content profile across the temperature range of from typical room temperature to body temperature, i.e., from about 21.1° C. (70° F.) to about 37° C. (98.6° F.). The slope of the SFC profile is expressed as the change in percent solids per unit change in temperature, in °F. Typically the slope of the Solid Fat Content (SFC) between these temperatures is between 0 and −0.75. Generally, the greater the weight percent of $C_{20}$ or higher saturated fatty acid radicals in the solid polyol polyester, the flatter the SFC slope will be. For example, at the 30% $C_{20}$ or higher fatty acid level the slope will typically be between 0 and −0.5, and at 50% it will typically be between 0 and −0.3.

Determination of SFC values over a range of temperatures can be done by a method involving PNMR (Pulsed Nuclear Magnetic Resonance). Such method is well known to those skilled in the art (see *J. Amer. Oil Chem. Soc.*, Vol. 55 (1978), pp. 328-31, and A.O.C.S. Official Method Cd. 16-81, *Official Methods and Recommended Practices of The American Oil Chemists Society*, 3rd. Ed., 1987; both incorporated herein by reference).

Examples of nondigestible edible oils which can be used in compositions of the invention are liquid polyesters of sugars and sugar alcohols (U.S. Pat. No. 4,005,195, Jandacek, issued Jan. 25, 1977); liquid alkyl glycoside polyesters (U.S. Pat. No. 4,840,815 (Meyer et al.), issued Jun. 20, 1989); liquid esters of tricarballylic acids (U.S. Pat. No. 4,508,746, Hamm, issued Apr. 2, 1985); liquid diesters of dicarboxylic acids such as derivatives of malonic and succinic acid (U.S. Pat. No. 4,582,927, Fulcher, issued Apr. 15, 1986); liquid triglycerides of alpha-branched chain carboxylic acids (U.S. Pat. No. 3,579,548, Whyte, issued May 18, 1971); liquid ethers and ether esters containing the neopentyl moiety (U.S. Pat. No. 2,962,419, Minich, issued Nov. 29, 1960; liquid fatty polyethers of polyglycerol (U.S. Pat. No. 3,932,532, Hunter et al., issued Jan. 13, 1976); liquid polyesters of two ether-linked hydrocarboxylic acids (e.g. citric or isocitric) (U.S. Pat. No. 4,888,195 to Huhn et al., issued Dec. 14, 1988); liquid esters of epoxide-extended polyols (U.S. Pat. No. 4,861,613 to White et al., issued Aug. 29, 1989); all incorporated herein by reference. Edible polydimethyl siloxanes (e.g., Fluid Silicones available from Dow-Corning Corporation) constitute another type of nondigestible oil which can be used in the compositions herein. They can also be combined with intermediate melting nondigestible polyol polyesters such as those disclosed in U.S. Pat. No. 4,880,657, Guffey et al., issued Nov. 14, 1989, incorporated by reference herein.

When substituting the present nondigestible oil/solid polyol polyester compositions for fat in foods which contain fat and non-fat ingredients (e.g., starches, sugar, non-fat milk solids, etc.) the solid polyol polyesters are included to control passive oil loss when said foods are ingested. In such products the mixture of solid polyol polyester of the invention and nondigestible oil is substituted for from about 10% to 100% of the fat normally present in such foods.

Preferred nondigestible oils are polyol fatty acid polyesters wherein the polyol is a sugar or sugar alcohol having at least 4 hydroxyl groups (preferably 4 to 8 hydroxyl groups). Examples of such are raffinose octaoleate, sucrose octaoleate, and sorbitol hexalinoleate.

C. Liquid Digestible Oil Components

The shortening compositions of the present invention optionally comprise less than about 90%, preferably less than about 65%, most preferably less than about 50% liquid digestible oil having an iodine value from about 75 to about 150 and most preferably from about 90 to about 130. The digestible oil can be an edible glyceride oil or a partially hydrogenated glyceride oil or fat having the specified iodine value. Suitable digestible oils can be derived from animal, vegetable, or marine sources, including naturally occurring triacylglyceride oils and fats such as cottonseed oil, soybean oil, peanut oil, olive oil, corn oil, rapeseed oil, canola oil, sunflower seed oil, sesame oil, safflower oil, sardine oil, and the like. Very highly unsaturated oils may require some hydrogenation to improve their resistance to oxidative deterioration. Reducing the level of triunsaturated fatty acids to less than about 4% is desirable for oxidative stability. Hydrogenation to reduce the iodine value of these highly unsaturated oils to less than about 120 generally is sufficient for purposes of this invention. Methods for hydrogenating unsaturated oils are well known in the art. It is also possible to reduce the level of triunsaturated by selective breeding. A preferred liquid digestible oil base stock is canola oil, having an iodine value of from about 75 to about 120, preferably from about 90 to about 110.

Other suitable digestible oils having iodine values greater than about 75 for use in this invention can be derived from natural or synthetic fats and oils containing in the glyceride molecule long chain acyl radicals having from about 12 to about 24 carbon atoms such as lauroyl, lauroleoyl, myristoyl, myristoleoyl, palmitoyl, palmitoleoyl, stearoyl, oleoyl, linoleoyl, linolenoyl, elaidoyl, arachidoyl, gadoleoyl, arachidonoyl, behenoyl, erucoyl, brassidoyl, clupanodonoyl, lignoceroyl, and/or selacholeoyl. A portion of the base stock glyceride also can contain in the molecule one or two short chain acyl groups having from 2 to about 10 carbon atoms such as acetyl, propanoyl, butanoyl, pentanoyl, hexanoyl and the like. Suitable digestible oils can be derived from randomly and low temperature interesterified fatty triglyceride containing oils and fats such as interesterified cottonseed oil and lard.

Triglyceride oils useful in the compositions of the present invention can include certain triglycerides in which one or two of the OH groups of the glycerol molecule have been replaced by acetyl, propionyl, butyryl, or caproyl, and the remaining OH groups of the glycerol molecule (if any) have been replaced by acyl radicals of higher molecular weight saturated or unsaturated fatty acids having from 12 to 22 carbon atoms. For the purposes of the present invention, these glycerides containing both high and low molecular weight acid radicals are referred to as low molecular weight synthetic fats. The low molecular synthetic fats selected should be fluid or liquid at 25° C. In order to resist oxidation and to prevent rancidity, it is preferred to select low molecular weight synthetic fats in which there are a minimum of carbon-to-carbon double bonds in the higher molecular weight fatty acid radicals, and preferably not more than two double bonds in any single acid radical. Normally liquid fatty acids of the oleic acid series, having a single carbon-to-carbon double bond, are ideal for this purpose.

Suitable partial hydrogenation of the liquid oil to form the preferred digestible oil of this invention can be carried out by conventional methods, and is typically carried out by a process whereby the oil is contacted with hydrogen in the presence of nickel catalyst.

D. Intermediate Maltin Triglycerides

The present shortening additionally comprises from 0% to about 50% intermediate melting triglyceride fats. These intermediate melting triglycerides contribute to the crystal structure of the shortening and increase its oxidative stability. Further, the intermediate melting triglyceride can be beneficial in increasing the plastic range of the shortening, and in adjusting the shortening's solid fat content profile. Suitable intermediate melting triglycerides have an iodine value between about 25 and about 75. Triglyceride oils which can be hydrogenated to yield an intermediate melting fat are soybean oil, sunflower oil, safflower oil, canola oil, corn oil, palm oil, cottonseed oil, peanut oil, and the like, or mixtures thereof. Rearranged fats or oils prepared by interesterification can also be used herein. Preferred intermediate melting fats are hydrogenated to an iodine value of about 35 to about 55.

E. Hardstock Fat

The shortening compositions of the present invention may optionally contain an additional solid component. This component is referred to as a hardstock fat. The shortening composition comprises from 0% to about 10% hardstock polyol fatty acid esters and/or from 0% to about 20% hardstock triglycerides. The hardstock provides plasticity to the present shortening in combination with the other fat materials, and it is also important for providing high temperature heat stability. Additionally, the hardstock affects the crystal structure of the shortening. The addition of more hardstock tends to flatten out the solid fat content profile of the shortening.

The triglyceride component of the hardstock fat is a substantially completely hydrogenated triglyceride fat or oil having an iodine value not exceeding about 12. The hardstock fat can be obtained by hydrogenating naturally occurring oils such as palm oil, cottonseed oil, soybean oil, sunflower oil, corn oil, rapeseed oil, canola oil, peanut oil, and the like, or mixtures thereof. Preferred hardstocks are those that are triglycerides containing palmitic-stearic-palmitic or palmitic-stearic-stearic fatty acids in the 1, 2 and 3 positions. Certain vegetable oils or fractions thereof contain these predominantly beta-prime triglycerides, for example, hardened palm oil and hardened cottonseed oil.

Hardened polyol fatty acid polyesters having an iodine value not more than about 12 are also useful as the hardstock fat. The hardstock polyesters can contain more saturated than unsaturated fatty acids, and more longer than shorter fatty acid chains. Typical examples of hardstock polyol polyesters include sucrose octastearate, sucrose octapalmitate, sucrose heptastearate, xylitol pentastearate, galactose pentapalmitate, sucrose hepta- and octaesters of soybean oil fatty acids that have been hydrogenated to an iodine value of from about 1 to about 12, and the like.

F. Other Shortening Ingredients

The present shortening also comprises from about 0% to about 15% by weight of other shortening ingredients. Various additives can be used herein provided that they are edible and aesthetically desirable and do not have any detrimental effects on the shortenings. These additives include flavorings, emulsifiers, anti-spattering agents (for frying applications), anti-sticking agents, anti-oxidants, anti-foaming agents, or the like. As with standard shortenings, nitrogen can also be added to the shortening during processing to improve the texture and lightness of color of the product.

G. Plastic Shortenings

The preferred embodiments of the present shortenings have stability over a wide range of storage temperatures. Specifically, the solids fat content profile over the range of temperatures encountered during the processing, packing, warehousing, shipping and subsequent consumer storage conditions must be relatively flat. If the solids profile is not relatively flat across this temperature range, shortening which melts and recrystallizes in moving across this range will be brittle, chunky or in other ways not smooth and creamy in appearance. The temperature range of 50° F. (10° C.) to 105° F. (41° C.) is representative of the typical temperature range a shortening product would encountering during processing, packing, warehousing, shipping, and subsequent consumer storage. One indicator of temperature cycling stability is the Solid Fat Content (SFC) profile. Variations in SFC slope from about 0.00 to about −0.40 measured as "change in percent solids/change in temperature (°F)" are acceptable for providing a shortening with creamy appearance. For example, a change in solids of 10% over the temperature range of 50° F. (10° C.) to 105° F. (41° C.) would be acceptable, whereas a change in solids of 30% over the same temperature range would not be acceptable. The SFC profile slope will preferably range from about 0.00 to about −0.30, and most preferably from about 0.00 to about −0.20.

As well as the overall SFC profile slope between 50° F. (10° C.) and 105° F. (41° C.), the maximum slope between any given 20° F. (11° C.) temperature range between 50° F. (10° C.) and 105° F. (41° C.) can also be important for assuring a creamy appearance. Preferably, the shortening will have an SFC profile such that the maximum negative (or positive) slope of the SFC profile between any given 20° F. (11° C.) temperature range is about −0.40 (0.40), more preferably about −0.30 (0.30) and most preferably about −0.20 (0.20).

The penetration or firmness of the shortening at 70° F. (21° C.) is also important to providing a creamy appearance. The shortening has a penetration between about 100 mm/10 and about 400 mm/10 at 70° F. (21° C). Preferably, the shortening has a penetration between about 150 mm/10 and about 300 mm/10 at 70° F. (21° C.). (Methodology described below.)

H. Uses of the Shortening

The present shortenings are useful in a wide variety of food and beverage products.

These shortenings can be used in frying applications such as the preparation of french fried potatoes, potato chips, donuts, corn chips, tortilla chips, chicken, fish, and battered and fried foods (e.g. shrimp tempura). The individual shortening composition components may be mixed before preparing foods or they can be added separately to the foods.

These shortenings can also be used in the production of baked goods in any form, such as mixes, shelf-stable baked goods, and frozen baked goods. Possible applications include, but are not limited to, cakes, brownies, muffins, bar cookies, granola bars, wafers, biscuits, pastries, pies, pie crusts, and cookies, including sandwich cookies and chocolate chip cookies, particularly the storage-stable dual-textured cookies described in U.S. Pat. No. 4,455,333 of Hong & Brabbs. The baked goods can contain fruit, cream, or other fillings. Other baked good uses include breads and rolls, crackers, pretzels, pancakes, waffles, ice cream cones and cups, yeast-raised baked goods, pizzas and pizza crusts, and baked farinaceous snack foods, and other baked salted snacks.

The shortenings herein can also be used as a component of the fat portion of many other foods such as ice cream, frozen desserts, cheese, meats, chocolate confections, salad dressings, mayonnaise, spreads, margarine, and fat-containing beverages (e.g., milk and milk-shakes). The individual shortening components may be mixed before preparing food compositions or they can be added separately to the foods.

The present shortening compositions can also be fortified with vitamins and minerals, particularly the fat-soluble vitamins. The fat-soluble vitamins include vitamin A, vitamin D, and vitamin E. (See U.S. Pat. No. 4,034,083 (Mattson) issued Jul. 5, 1977, incorporated by reference herein.)

The shortening compositions herein can be used in combination with other nondigestible fats, such as branched chain fatty acid triglycerides, triglycerol ethers, polycarboxylic acid esters, sucrose polyethers, neopentyl alcohol esters, silicone oils/siloxanes, and dicarboxylic acid esters. Other partial fat replacements useful in combination with the materials herein are medium chain triglycerides, triglycerides made with combinations of medium and long chain fatty acids (like the ones described in European Patent Application 0322027 (Seiden) published Jun. 28, 1989), highly esterified polyglycerol esters, acetin fats, plant sterol esters, polyoxyethylene esters, jojoba esters, mono/diglycerides of fatty acids, and mono/diglycerides of short-chain dibasic acids.

The shortening compositions are particularly useful in combination with particular classes of food and beverage ingredients. For example, an extra calorie reduction benefit is achieved when the present shortenings are used with noncaloric or reduced calorie sweeteners alone or in combination with bulking agents. Noncaloric or reduced calorie sweeteners include, but are not limited to, aspartame, saccharin, alitame, thaumatin, dihydrochalcones, acesulfame, and cyclamates.

Bulking or bodying agents are useful in combination with the shortening compositions herein in many food compositions. The bulking agents can be nondigestible compositions, for example, polydextrose and cellulose or cellulose derivatives, such as carboxymethylcellulose, carboxyethylcellulose, hydroxypropylcellulose, methylcellulose, hydroxypropyl methylcellulose and microcrystalline cellulose. Other suitable bulking agents include gums (hydrocolloids), starches, dextrins, fermented whey, tofu, maltodextrins, polyols, including sugar alcohols, e.g., sorbitol and mannitol, and carbohydrates, e.g., lactose.

Similarly, food and beverage compositions can be made that combine the present shortening compositions with dietary fibers to achieve the combined benefits of each. By "dietary fiber" is meant complex carbohydrates resistant to digestion by mammalian enzymes, such as the carbohydrates found in plant cell walls and seaweed, and those produced by microbial fermentation. Examples of these complex carbohydrates are brans, celluloses, hemicelluloses, pectins, gums and mucilages, seaweed extract, and biosynthetic gums. Sources of the cellulosic fiber include vegetables, fruits, seeds, cereals, and manmade fibers (for example, by bacterial synthesis). Commercial fibers such as purified plant cellulose, or cellulose flour, can also be used. Naturally occurring fibers, such as psyllium, and fibers from whole citrus peel, citrus albeds, sugar beets, citrus pulp and vesicle solids, apples, apricots, and watermelon rinds.

These dietary fibers may be in a crude or purified form. The dietary fiber used may be of a single type (e.g., cellulose), a composite dietary fiber (e.g., citrus albedo fiber containing cellulose and pectin), or some combination of fibers (e.g., cellulose and a gum). The fibers can be processed by methods known to the art.

Of course, judgment must be exercised to make use of the present shortening compositions and combinations thereof with other food ingredients. For example, a combination of sweetener and present shortening compositions would not be used where the specific benefits of the two are not desired. The shortening composition and shortening composition/ingredient combinations are used where appropriate, and in appropriate amounts.

Many benefits are obtained from the use of the present shortening composition in food and beverage compositions, either when used alone or in combination with edible oils and/or other ingredients discussed above. A primary benefit is the calorie reduction achieved when shortening compositions are used as a total or partial fat replacement. This calorie reduction can be increased by using combinations of the present shortening compositions with reduced calorie sweeteners, bulking agents, or other nondigestible fats and oils. Another benefit which follows from this use is a decrease in the total amount of digestible fats in the diet. Furthermore, a significant reduction in saturated fat consumption can be achieved by substituting the present pourable composition for saturated fats in the diet. Foods or beverages made with the nondigestible solid fat materials instead of animal-derived triglyceride fats will also contain less cholesterol, and the ingestion of these foods can lead to reduced serum cholesterol and thus reduced risk of heart disease. Also, compositions made with these fat materials have acceptable organoleptic properties, particularly lack of waxiness.

Dietary foods can be made with the shortening compositions, to meet special dietary needs, for example, of persons who are obese, diabetic, or hypercholesterolemic. The present shortening compositions can be a major part of a low-fat, low-calorie, low-cholesterol diet, and they can be used alone or in combination with drug therapy or other therapy. Combinations of food or beverage products made with the present shortening compositions can be used as part of a total dietary management regimen, based on one or more of these products, containing the fat materials alone or in combination with one or more of the above-mentioned ingredients, to provide one or more of the above-mentioned benefits.

This discussion of the reduced calorie plastic shortening, uses, combinations, and benefits is not intended to be limiting or all-inclusive. It is contemplated that other similar uses and benefits can be found that will fall within the spirit and scope of this invention.

In addition to food compositions, the compositions of the present invention can be used in formulating lubricants, skin creams, pharmaceuticals, cosmetics and the like.

The invention will be illustrated by the examples which follow the analytical methods.

Analytical Methods

A. Solid Fat Content

Before determining Solid Fat Content (SFC) values, a sample of the shortening or nondigestible liquid/solid is heated to a temperature of 140° F. (60° C.) or higher for at least 30 minutes or until the sample is completely melted. The melted sample is then tempered as follows: at 80° F. (26.7° C.) for 15 minutes; at 32° F. (0° C.) for 15 minutes; at 80° F. (26.7° C.) for 30 minutes; and at 32° F. (0° C.) for 15 minutes. After tempering, the SFC values of the sample at temperatures of 50° F. (10° C.), 70° F. (21.1° C.), 80° F. (26.7° C.), 92° F. (33.3° C.) and 98.6° F. (37° C.), or 105° F. (31° C.) can be determined by pulsed nuclear magnetic resonance (PNMR) after equilibration for 30 minutes at each temperature. The method for determining SFC values by PNMR is described in Madison and Hill, *J. Amer. Oil Chem. Soc.*, Vol. 55 (1978), pp. 328–31 (herein incorporated by reference). Measurement of SFC by PNMR is also described in A.O.C.S. Official Method Cd. 16-81, *Official Methods and Recommended Practices of The American Oil Chemists Society*, 3rd. Ed., 1987 (herein incorporated by reference).

The slope of the SFC profile is calculated by subtracting the percent solids at 70° F. from the percent solids at 98.6° F. and dividing that value by 28.6.

B. Yield Point

Apparatus:

Contraves Rheomat 115 manufactured by Contraves AG, Zurich, Switzerland, controlled rate rheometer with cone and plate attachment.

Method: Gap is set automatically. Calibrate torque meter to 0.0.

1) Measuring apparatus is allowed to equilibrate to 70.0° F.±0.1° F.

2) Sample is applied to plate and cone is allowed to gently settle onto plate.
3) Run scan shown below:

|  | Curve 1 |
| --- | --- |
| Sensitivity | 1.0 |
| First minimum shear rate (sec-1) | 0.000 |
| Time at minimum shear rate (sec) | 120.0 |
| Ascending ramp time (sec) | 60.0 |
| Maximum shear rate (sec-1) | 20.000 |
| Hold time (sec) | 10.0 |
| Second minimum shear rate (sec-1) | 0.000 |
| Descending ramp time (sec) | 60.0 |

4) At completion of test, instrument calculates yield point and thixotropic area using Casson-Steiger Model. The yield point is defined as the shear stress required to cause flow.

C. Measure of Penetration

Penetration is a measure of the firmness or consistency of a shortening. Penetration is measured by measuring the distance a given weight (47 grams) of defined shape will penetrate the shortening after falling from a height of 2 centimeters above the surface of the shortening. The firmness of the shortening is related to its composition and character, and to the temperature of the sample at the time of measurement. A standard method for measuring penetration is described in A.O.C.S. Official Method Cc 16-60 (incorporated by reference herein). However, the method for measuring penetration values of the present invention is modified in several respects, for example, a modified Precision Universal Penetrometer (manufactured by Precision Scientific Co., Chicago, Ill.) is used to measure the penetration. The penetrating device comprising the shaft and needle (or "cone") is also modified.

Apparatus

Constant temperature boxes or room, automatically controlled to maintain the temperature at 85° F.±1° F. (29.5° C.±0.5° C.) and 70°±1° F. (21.1° C.±0.5° C.).

A specially designed needle, shaft and collar weighing 47 grams total, and described below in detail.

A titer thermometer with a temperature range of 20° to 40° C. (68° F. to 104° F.) or 15° to 35° C. (59° F. to 95° F.), reading to 0.1° C. (0.2° F.).

A sample container, either a 1 lb. or 3 lb. can.

A Precision Universal Penetrometer, modified as described below. The penetrometer is a mechanical device which provides in one unit a support or housing to grip and release the penetrating device (shaft and needle), a platform to support the sample, spirit level and adjustments to maintain the penetrometer in a level position and a depth gauge graduated to allow reading the depth of penetration in 0.1 mm units.

Specially Designed Shaft and Needle

The penetrating device comprising a shaft 1 and needle 2 (or "cone") is illustrated in FIG. 1 of U.S. Pat. No. 4,880,657 incorporated herein by reference. A 9" long hollow steel rod having a 3/16" outer diameter is used for the shaft. At the end of the shaft is a 2" long hollow stainless steel needle or cone. The point end of the needle has a 1/32" diameter, and the enlarged end has a 19/32" diameter. The needle can be unscrewed from the shaft to insert weights into the hollow needle. A magnesium collar 3 with a set screw 4 is positioned around the shaft, about 4¼" from the end opposite the needle. The collar is 7/16" in diameter and ¼" thick. The penetrating device as a whole, including the collar, must weigh 47 grams.

Precision Universal Penetrometer Modification

In placing the shaft and needle in the housing of the instrument, the contact finger on the depth gauge is positioned below the collar. The collar is adjusted on the shaft so as to allow the depth gauge its full travel of 520 units. This is accomplished by moving the shaft upward until the needle is about two centimeters below the bottom of the housing and then sliding the collar up against the top of the housing and tightening the set screw. Next the shaft is lowered exactly two centimeters. Using the gauge block adjust the depth gauge contact finger all the way up against the collar using the adjuster screw. Remove the shaft and needle, pin the collar to the shaft and adjust the weight to 47 grams.

Conditioning of Sample

The shortening sample is tempered at 85°±1° F. (29.5°±0.5° C.) for 24 hours and then stored at 70°±1° F. (21.1° C.±0.5° C.) for 24 hours.

Checking the Penetrometer

Check the needle rise against the 2 cm. gauge-block as follows: With the indicator and depth gauge in the zero position lower the penetrometer head by means of the course adjusting screw until the point of the needle just touches the pad block (large diameter block) then lock the screw in this position. Squeeze the clutch trigger and raise the needle to the extreme top position (collar touching the top of the housing). Check the distance between the needle point and pad by placing the 2 cm. gauge block on the pad and carefully passing it under the needle point; the needle point should just clear the 2 cm. gauge block. If the distance so determined is not exactly 2 cm., adjust the depth gauge adjusting screw until the rise and fall of the needle is exactly 2 cm. Set the depth gauge indicator needle to read zero by removing the face plate cover and loosening the knurled nut holding the needle in place. This check should be made once before each series of measurements.

Operation

If possible make all penetrations in a room controlled at 70°±1° F. (21.1°±0.5° C.). If this is impossible, conduct the actual penetration operation immediately after the sample is removed from the 70° F. (21.1° C.) box. Smooth the surface of the sample by scraping, but do not disturb the contents of the can below about 0.25" of the original surface of the shortening. Immediately place the sample container on the shelf of the penetrometer, which has been leveled previously by means of the leveling screws in the base. Penetrate each sample at three or more points at least one inch apart and at least one inch from the side of the container, being certain to clean the needle by wiping with a tissue between each penetration. Under no circumstances should the needle be removed from the shaft for cleaning purposes. (Insert the thermometer in the center of the sample up to its immersion mark and record temperature to 0.1° C. (0.2° F.). The temperature at which the penetration test is made should be 21.1°±0.5° C. [70°±1° F.]) The average of the penetrations is recorded as the uncorrected penetration. This value is corrected for penetration temperature deviation as follows: a correction of 0.5 points for every 0.1° C. (0.2° F.) above or below 21.1° C. (70° F.) should be made. If below 21.1° C. (70° F.), add the correction; if above, subtract.

Bring the indicator to zero by pulling up on the depth gauge until it stops, then squeeze the clutch trigger and again pull up on the depth gauge until it reaches zero. Release the clutch trigger. If the indicator does not read zero, adjust with the zero setting screw. By means of the coarse adjusting screw, bring the needle down until its point just touches the surface of the sample. Grasp the top of the needle, squeeze the clutch trigger and pull the needle up as far as it will go. This will raise the needle two centimeters above the sample. Release the clutch trigger. Push the depth gauge down as far as it will go.

Release the needle by squeezing the clutch trigger. In operating the clutch trigger, grasp the finger grip firmly with the forefinger, and with the thumb depress the clutch trigger quickly as far down as it will go. Then immediately pull the depth gauge up until it stops and read the dial. The reading is the penetration in tenths of a millimeter (mm/10).

D. Complete Melting Point

Equipment:
Perkin-Elmer 7 Series Thermal Analysis System, Model DSC7, manufactured by Perkin-Elmer, Norwalk, Conn.
Procedure:
1) Sample is heated to at least 10° C. above the complete melting point and mixed thoroughly.
2) 10±2 mg. of sample is weighed into sample pan.
3) A scan is performed from about 10° C. above the complete melting point to −60° C. at 5° C. per minute.
4) The temperature of the sample is maintained at −60° C. for 3 minutes and rescanned from −60° C. to the original starting temperature at 5° C. per minute (i.e. about 10° C. above the complete melting point).
5) The complete melting point is the temperature at the intersection of the baseline (specific heat line) with the line tangent to the trailing edge of the endothermic peak.

E. Ester Distribution of Sucrose Polyesters

The relative distribution of the individual octa-, hepta-, hexa- and penta- esters, as well as collectively the tetra- through monoesters, of the sucrose polyesters can be determined using normal-phase high performance liquid chromatography (HPLC). A silica gel-packed column is used in this method to separate the polyester sample into the respective ester groupings noted above. Hexane and methyl-t-butyl ether are used as the mobile phase solvents. The ester groupings are quantitated using a mass detector (i.e. an evaporative light-scattering detector). The detector response is measured and then normalized to 100%. The individual ester groups are expressed as a relative percentage. F.

EXAMPLE I

Preparation of Tetrabehenyl Tetracaprylyl Sucrose

Methyl Ester Route

An alternative method for preparation of $C_8$–$C_{22}$ sucrose polyesters is by a modification of the process described in U.S. Pat. Nos. 4,518,772, supra, and 4,517,360, supra. Sucrose is reacted with methyl caprylate in the presence of a potassium soap and a basic catalyst such as $K_2CO_3$ to form sucrose octacaprylate. The octacaprylate is then reacted with methyl behenate in the presence of sodium methoxide for an interesterification to the $C_8$–$C_{22}$ product of interest.

Chemicals:

| | Mol. Wt. | Wt. (g) | Mole Moles | Ratio |
|---|---|---|---|---|
| A. Reaction | | | | |
| 1. Sucrose | 342.3 | 300.00 | 0.0204 | 1 |
| 2. Potassium Behenate | 387.60 | 124.10 | 0.328 | 0.375 |
| 3. Methyl Caprylate | 158.24 | 1663.40 | 6.132 | 7.000 |
| 4. Methyl Behenate | 354.60 | 2174.40 | 6.132 | 7.000 |
| 5. Potassium Carbonate | 138.21 | 12.107 | 0.0876 | 0.100 |
| 6. Sodium Methoxide | | 54.00 (½% by wt. of mixture) | | |
| B. Solvents | | | | |
| 1. Methanol | | | | |
| 2. Hexane | | | | |

Procedure

Step A - Preparation of Potassium Behenate

Methyl behenate (0.375 moles/mole of sucrose to be used in Step B) is saponified by stirring at reflux in methanol containing an equivalent amount of KOH. The reaction is stirred with heating until all methyl ester has been converted to soap as indicated by infrared analysis. The soap solution is used, as is in the next reaction step.

Step B - Preparation of Sucrose Octacaprylate

Methyl caprylate (12 moles/mole of sucrose) is added directly to the potassium behenate-methyl alcohol solution from Step A above. The mixture is stripped under vacuum to remove the methanol. Sucrose and potassium carbonate are then added to the soap-methyl caprylate mixture and the reaction mixture heated to 135° C. and placed under a partial vacuum.

The reaction is allowed to proceed until the sucrose is converted to its octacaprylate. The endpoint is determined by liquid or super critical fluid chromatography.

The reaction mixture is cooled to 95° C. and 7% $H_2O$ is added to form the hydrate of the soap.

The soap separates as a sludge and is removed by centrifugation, filtration and/or decantation. The oil layer (sucrose octacaprylate/methyl ester layer) is washed several times with hot water, separated and the residual water removed by $N_2$ sparging at 110° C.

The crude octacaprylate is then decolorized with a mixture of filtrol and celite and the bleaching earths removed by vacuum filtration. The excess methyl esters are removed by distillation at 130° C. and 1 mm Hg.

Step C - Preparation of $C_8$–$C_{22}$ Sucrose Polyesters

Sucrose octacaprylate (from Step B above) and 7 moles of methyl behenate are combined with sodium methoxide in a reactor. While stirring, the temperature is raised to 120° C. and the reactor placed under vacuum.

The methyl caprylate formed during interesterification is distilled from the reaction mixture and collected. The reaction is continued until 4-5 moles of methyl caprylate are collected (the ratio of $C_8$–$C_{22}$ on the sucrose may be adjusted by the amount of methyl caprylate removed).

The reaction mixture is then cooled to 90° C. and neutralized with glacial acetic acid.

The product is diluted with hexane and the hexane solution washed several times with hot water.

The water washes are separated and the hexane, along with any residual water, is removed via $N_2$ sparging at 110° C. The product is then rediluted with hexane and is decolorized with a mixture of charcoal and filtrol.

The charcoal/filtrol is removed by vacuum filtration and the solvent removed by vacuum distillation. Excess and/or residual methyl esters are removed by thin film evaporation and the product crystallized from a hexane/reethanol solution.

(Steam stripping at 210° C. and 1 mm Hg is an optional final step.)

EXAMPLE II

Preparation of a Solid Sucrose Polyester from Methyl Esters Containing High Proportions of $C_{18}$ Mono- and Di- Unsaturates and $C_{22}$ Saturates This example describes the preparation of solid sucrose polyesters of this invention by a modification of the process described in U.S. Pat. Nos. 4,518,772, supra, and 4,517,360, supra.

High erucic acid rapeseed oil (HEAR) is blended with low erucic acid rapeseed oil (LEAR) to a composition of 38% erucic acid. The rapeseed oil blend is mixed with 3%–6% refined, bleached cottonseed oil to obtain an oil composition having approximately 35% of $C_{22}$ acid (i.e., behenic plus erucic). This rapeseed/cottonseed stock is then hydrogenated to an iodine value less than 4. Hydrogenation is done with nickel catalyst levels typical of any vegetable oil using 0–100 psig pressure, and a temperature of approximately 375° F.

The material is deodorized at a temperature of 375°–495° F. The hardened, deodorized rapeseed/cottonseed oil has the following characteristics: fatty acid composition: 3–7% $C_{16:0}$, 45–55% $C_{18:0}$, 0–2% $C_{18:1}$, 0–1% $C_{18:2}$, 4–8% $C_{20:0}$, 33–37% $C_{22:0}$, 0–1% $C_{22:1}$, 0–2% $C_{24:0}$. Free fatty acid content is 0.01–0.1% and Lovibond red color is about 1.0.

The rapeseed/cottonseed oil is converted into methyl esters through an esterification process in which the oil is mixed with methanol, a sodium methoxide catalyst is added, and the reaction is continued until all the triglycerides are converted into methyl esters. Glycerine is settled by gravity after the reaction is completed. The esters are then water washed with hot water to remove trace levels of glycerine and soap. The water phase is settled out by gravity after each wash.

The esters are flash distilled in a batch mode to both remove unsaponifiable materials and to obtain a more concentrated $C_{22}$ material. The distillation is done under a vacuum of 0.5–2mm Hg and a temperature of 300°–410° F. The last 10%–15% of the esters distilled are collected into a clean vessel for use in making the desired sucrose polyester. The other 85–90% is discarded. The ester composition of the last 10–15% collected is: 4% $C_{18:0}$, 6% $C_{20:0}$, 87% $C_{22:0}$, 3% $C_{24:0}$. These are esters "A".

Refined and bleached sunflower oil is deodorized at a temperature of 375°–495° F. under vacuum. The deodorized sunflower oil has the following characteristics: iodine value: 125–140; fatty acid composition: 5–10% $C_{16:0}$, 2–6% $C_{18:0}$, 19–26% $C_{18:1}$, 63–74% $C_{18:2}$, 0-2% $C_{18:3}$, 0-1% $C_{20:0}$, 0-1% $C_{22:0}$. Free fatty acid content is 0.01-0.1% and Lovibond red color is about 1.3.

The sunflower oil is converted into methyl esters through the same esterification process as described above. The esters are flash distilled in a batch mode, primarily to remove unsaponifiable materials. The distillation is done under a vacuum of 0.5-2.0 mm Hg and a temperature of 300°-410° F. These are esters "B".

About 70.5 Kg of methyl esters of a refined soybean oil, fatty hardened to an iodine value of about 2, are mixed with 209 Kg of methanol and 15.4 Kg of potassium hydroxide in a stainless steel batch reactor. The mixture is heated to about 145° F. (63° C.) with agitation for 1 to 3 hours at atmospheric pressure. During this time, all but a residual amount of the methyl esters are saponified to make soap.

About 1193.6 Kg of ester "A" is blended with 241.4 Kg of ester "B" to make ester blend "C". The ester composition of blend "C" is: 1.2% $C_{16:0}$, 3.8% $C_{18:0}$, 3.8% $C_{18:1}$, 10.7% $C_{18:2}$, 4.7% $C_{20:0}$, 71.9% $C_{22:0}$, 3% $C_{24:0}$. About 545.5 Kg. of ester "C" are added to the previously made soap mixture.

About 104.5 Kg of granular sucrose are then added to give a 5:1 molar ratio of methyl ester to sucrose. Potassium carbonate is then added to the mixture (approx. 0.5 wt. percent of the reaction mix) to catalyze the transesterification. This mixture is agitated and slowly heated at atmospheric pressure until the temperature reaches about 275° F. (135° C.). This is to remove the methanol. A vacuum is then pulled and the mixture agitated for up to 8 hours to form the mono-, di- and trisucrose esters. Small quantities of tetra- and pentaesters are also formed during this stage. Additional methyl ester "C" (890 Kg) which has been preheated to 275° F. (135° C.) is added to bring and maintain the molar ratio of the esters to sucrose to 14-15:1. Additional potassium carbonate is then added twice to the mixture (each addition being approximately 0.5 wt. percent of the initial reaction mix). When the reaction conditions stabilize at 275° F. (135° C.), a nitrogen sparge is used to improve agitation and promote methanol stripping. This second reaction stage lasts approximately 4 to 13 hours.

The reaction mixture is then cooled under nitrogen to between 149° F. (65° C.) and 185° F. (85° C.). The crude reaction mixture is agitated with about 91 Kg water. The hydrated crude reaction mixture is passed through a centrifuge to separate a heavy and a light phase. The heavy phase which contains the soaps, excess sugars and potassium carbonate is discarded. The light phase was then washed with an additional 264 Kg of water.

The light phase, which contains methyl esters and the sucrose polyester is then dried to remove moisture at 170° F.-190° F. (76°-88° C.) under 70 mm Hg or less vacuum for 30 to 60 minutes. Filtrol 105 (1.0 wt. percent) is added and the mix is agitated at 167° F. (75° C.) to 190° F. (88° C.). The slurry is separated by filtration or other means until there is less than 0.1 wt. percent fines. The liquid is then passed through a 1 micromillimeter filter.

The refined and bleached reaction mix is then passed through a stainless steel wiped-film evaporator or other suitable equipment to distill off the bulk of the methyl esters. The distillation takes place at 392° F. (200° C.) to 455° F. (235° C.) under approximately 0.5 mm Hg of vacuum.

The sucrose polyester is then deodorized by passing downward through a stainless steel packed column deodorizer or other suitable device at 392° F. (200° C.) to 450° F. (232° C.) under a vacuum of about <25 mm Hg or less. Steam is introduced to the bottom of the column and passes counter-currently to the sucrose polyester. Feed rates and temperature are adjusted until the methyl ester content of the sucrose polyester is below 1000 ppm. The mixture is then cooled to between 149° F. (65° C.) to 185° F. (85° C.) and passed through a 1 micromillimeter filter. The sucrose polyester is stored in clean stainless steel drums.

Sucrose polyester made according to this procedure has the following approximate composition and properties:

|  | Wt % |
|---|---|
| Fatty Acid Composition | |
| $C_{16}$ | 1.2 |
| $C_{17}$ | 0 |
| $C_{16:1}$ | 0 |
| $C_{18}$ | 4.6 |
| $C_{18:1}$ | 3.7 |
| $C_{18:2}$ | 10.9 |
| $C_{18:3}$ | 0 |
| $C_{20}$ | 4.6 |
| $C_{20:1}$ | 0 |
| $C_{22}$ | 71.7 |
| $C_{22:1}$ | 0.2 |
| $C_{24}$ | 2.8 |
| Others | 0.4 |
| Iodine Value | 22.4 |
| Complete Melting Point | 70.4° C. |
| Ester Distribution | |
| Octa | 71.6 |
| Hepta | 28.2 |
| Hexa | 0.2 |
| Penta | <0.1 |
| Lower | <0.1 |

By varying the fatty acid composition of ester "A" and/or ester "B", and/or varying the ratio of ester "A" and ester "B" in preparing ester "C", this process can be used to make other solid sucrose polyol polyesters of the invention.

EXAMPLE III

Preparation of a Plastic Shortening for Use in Foodservice Cooking/Frying Applications

| EXAMPLE III Preparation of a Plastic Shortening for Use in Foodservice Cooking/Frying Applications | |
|---|---|
| Formulation: | |
| Solid sucrose fatty acid polyester (prepared according to the method of Example II) | 5.00% |
| Intermediate melting fraction triglyceride (soybean oil hydrogenated to an iodine value of 43) | 25.00% |
| Liquid digestible triglyceride oil (unhardened canola) | 10.00% |
| Liquid nondigestible sucrose fatty acid polyester (prepared by methyl ester route from a soybean oil source. I.V. of 80 and melting point of 17.0° C.) | 60.00% |
|  | 100.00% |

The above ingredients have the following compositions (wt %):

|  | Solid Polyol Polyester | Liquid Sucrose Polyester |
|---|---|---|
| Fatty Acid Composition | | |
| C12 | — | — |
| C14 | — | — |
| C16 | 1.2 | 10.0 |
| C16:1 | 0.0 | 0.1 |
| C18 | 4.6 | 8.0 |
| C18:1 | 3.7 | 69.1 |
| C18:2 | 10.9 | 11.1 |
| C18:3 | 0 | 0.2 |
| C20 | 4.6 | 0.3 |
| C20:1 | 0 | 0.3 |
| C22 | 71.7 | 0.2 |
| C22:1 | 0.2 | 0.0 |
| C24 | 2.8 | — |
| Other | 0.4 | 0.7 |
| Ester Distribution | | |
| Octa | 71.6 | 91.0 |
| Hepta | 28.2 | 9.0 |
| Hexa | 0.2 | <0.1 |
| Lower | <0.2 | <0.2 |

The above ingredients are plasticized by a freeze/pick process, and nitrogen gas is dispersed in the shortenings for appearance.

EXAMPLE IV

Preparation of a High Quality Plastic Shortening for Retail Cooking/Frying Applications

| Formulation: | Wt. % |
|---|---|
| Solid sucrose fatty acid polyester (prepared according to the method of Example II) | 1.05 |
| Liquid digestible oil (soybean oil with an iodine value of 107) | 43.10 |
| Intermediate melting fraction triglyceride (cotton/soy oil hydrogenated to an iodine value of 48) | 12.60 |
| Hardstock (cotton stearin hardened to an iodine value of 1) | 6.30 |
| Liquid sucrose fatty acid polyester nondigestible oil (prepared by methyl ester route from a soybean oil source. I.V. of 89 and a complet melting point of 12.1° C.) | 33.95 |
| Emulsifier (mono/diglycerides) | 3.00 |
| | 100.00 |

The above ingredients have the following compositions (wt %):

|  | Solid Sucrose Polyester | Liquid Sucrose Polyester |
|---|---|---|
| Fatty Acid Composition | | |
| C12 | — | — |
| C14 | — | — |
| C16 | 1.2 | 9.7 |
| C17 | 0 | 0.1 |
| C18 | 4.6 | 5.9 |
| C18:1 | 3.7 | 64.5 |
| C18:2 | 10.9 | 18.9 |
| C18:3 | 0 | 0.2 |
| C20 | 4.6 | 0.3 |
| C22 | 71.7 | 0.2 |
| C22:1 | 0.2 | 0.2 |
| C24 | 2.8 | — |
| Other | 0.4 | 0.2 |
| Ester Distribution | | |
| Octa | 71.6 | 78.7 |
| Hepta | 28.2 | 21.0 |
| Hexa | 0.2 | 0.2 |
| Lower | <0.2 | 0.3 |

The above ingredients are plasticized by a freeze/pick process, and nitrogen gas is dispersed in the shortenings for appearance. The shortening is tempered at 85° C. for 24 hours, then stored at 70° F. (21° C.).

The shortening exhibits the following physical characteristics:

| S.F.C. Data: | |
|---|---|
| Temp.° C. | % Solids |
| 10 | 15.2 |
| 21.1 | 13.4 |
| 26.7 | 12.4 |
| 33.3 | 11.3 |
| 40.5 | 6.7 |

Beta-prime crystal structure is present.
Penetration Data
265 mm/10 at 21° C.
Yield Point 1200 dynes/cm²

EXAMPLE V

Cookies Low in Calories

Cookies low in calories are prepared from the following ingredients:

| Ingredients | Amounts (gms) |
|---|---|
| Table Sugar (i.e., sucrose) | 352 |
| Flour | 328 |
| Plastic shortening (as prepared in Example IV) | 200 |
| Egg | 96 |
| Water | 20 |
| Conventional additives (flavors and a small amount of baking soda) | 8 |

The ingredients are combined and the resulting dough is kneaded until uniform. Dough balls (10–13 gm) are individually placed on a lightly greased cookie tray and then baked at 180° C. for 7–8 minutes to produce finished cookies.

EXAMPLE VI

White Cake

A white cake is prepared from the following ingredients:

| Ingredients | Amount (gm) |
|---|---|
| Table Sugar (i.e., sucrose) | 133 |
| Cake Flour | 107 |
| Plastic Shortening (as prepared in Example IV) | 47.5 |
| Double-acting baking powder | 6.7 |
| Milk | 130 |
| Egg whites | 60 |
| Vanilla | 2.5 |

The ingredients are stirred with an electric mixer to form a uniform batter. The batter is poured into a lightly greased 33 cm×23 cm×5 cm pan, and then baked at 180° C. for 40 minutes to produce the finished white cake.

What is claimed is:

1. A shortening comprising:
   (A) a solid polyol fatty acid polyester having a complete melting point about 37° C. wherein
      (i) the polyol has at least about 4 hydroxyl groups,
      (ii) the ester groups are comprised of (a) fatty acid radicals selected from the group consisting of $C_{12}$ or higher unsaturated fatty acid radicals, $C_2$-$C_{12}$ saturated fatty acid radicals, or mixtures thereof, and (b) $C_{20}$ or higher saturated fatty acid radicals at a molar ratio of a:b being from about 1:15 to about 1:1, and
      (iii) at least about 4 of the hydroxyl groups of the polyol are esterified;
   (B) a liquid nondigestible oil having a complete melting point below about 37° C.;
   (C) from 0% to about 90% by weight of a digestible oil having an iodine value between about 75 and about 150;
   (D) from 0% to about 50% intermediate melting fraction triglyceride having an iodine value between about 25 and about 75;
   (E) from 0% to about 20% by weight hardstock; and
   (F) from 0% to about 15% by weight other shortening ingredients;
   wherein the ratio of (A) to (B) is from about 1:99 to about 9:91, wherein the shortening composition has a yield point more than about 100 dynes/cm$^2$, wherein the combined level of (A) and (B) is greater than 10%, wherein at least 15% by weight of the fatty acid radicals in (A) are $C_{20}$ or higher saturated fatty acid radicals and wherein the slope of the SFC profile of the mixture of (A) and (B) between 37° C. and 21.1° C. is between 0 and about −0.75.

2. A shortening according to claim 1 wherein the solid polyol fatty acid polyester of (A) has (i) from about 4 to about 8 hydroxyl groups and (ii) ester groups which consist essentially of (a) fatty acid radicals selected from the group consisting of $C_{12}$ to $C_{26}$ unsaturated fatty acid radicals, $C_6$-$C_{12}$ saturated fatty acid radicals, or mixtures thereof, and (b) $C_{20}$-$C_{26}$ saturated fatty acids at a molar ratio of (a) to (b) being from about 1:7 to about 4:4.

3. A shortening according to claim 2 wherein the polyol of part (A) is sucrose and the ratio of (a) fatty acid radicals:(b) fatty acid radicals is from about 1:7 to about 3:5.

4. A shortening according to claim 3 wherein 7 or 8 hydroxyl groups are esterified.

5. A shortening composition according to claim 3 wherein at least about 30% by weight of the total fatty acid radicals in (A) are $C_{20}$ or higher saturated fatty acid radicals.

6. A shortening composition according to claim 5 wherein at least about 50% by weight of the total fatty acid radicals in (A) are $C_{20}$ or higher saturated fatty acid radicals.

7. A shortening composition according to claim 6 wherein at least about 60% by weight of the total fatty acid radicals in (A) are $C_{20}$ or higher fatty acid radicals.

8. A shortening according to claim 2 wherein the solid polyol fatty acid polyester of (A) has ester groups in part (A)(ii) which consist essentially of (a) fatty acid radicals selected from the group consisting of $C_{18}$ mono- and/or diunsaturated fatty acid radicals, $C_8$-$C_{12}$ saturated fatty acid radicals, or mixtures thereof, and (b) $C_{22}$ saturated fatty acid radicals.

9. A shortening according to claim 3 wherein the fatty acid radicals of (A)(ii)(a) are selected from the group consisting of lauroleate, myristoleate, palmitoleate, oleate, elaidate, erucate, linoleate, acetate, caproate, caprylate, caprate, laurate, and mixtures thereof, and the fatty acid radicals of (A)(ii)(b) are selected from the group consisting of arachidate, behenate, cerotate, lignocerate, and mixtures thereof.

10. A shortening according to claim 3 wherein the level of digestible oil is less than about 65% by weight.

11. A shortening according to claim 10 wherein the level of digestible oil is less than about 50% by weight.

12. A shortening according to claim 3 wherein said liquid nondigestible oil has a complete melting point below about 21° C.

13. A shortening according to claim 3 wherein said digestible oil has an iodine value between about 90 and about 130 and wherein said intermediate melting fraction triglyceride has an iodine value between about 35 and about 55.

14. A shortening composition according to claim 3 wherein the digestible oil (C) is a triglyceride.

15. A shortening composition according to claim 14 wherein the digestible oil (C) contains less than 4.0% by weight of $C_{18:3}$ triunsaturated fatty acid radicals.

16. A shortening according to claim 3 having a Solid Fat Content (SFC) such that the overall slope of the SFC profile between 50° F. (10° C.) and 105° F. (41° C.) of from 0.00 to about −0.40.

17. A shortening according to claim 16 hiving an overall SFC profile slope between 50° F. (10° C.) and 105° F. (41° C.) of from 0.00 to about −0.30.

18. A shortening according to claim 17 having an overall SFC profile slope between 50° F. (10° C.) and 105° F. (41° C.) of from 0.00 to about −0.20.

19. A shortening according to claim 3 wherein the maximum negative or positive slope of the SFC profile between any given 20° F. (11° C.) temperature range is about 0.40.

20. A shortening according to claim 19 wherein the maximum positive or negative slope of the SFC profile between any given 20° F. (11° C.) temperature range is about 0.30.

21. A shortening according to claim 20 wherein the maximum positive or negative slope of the SFC profile between any given 20° F. (11° C.) temperature range is about 0.20.

22. A shortening according to claim 16 having a penetration between about 100 mm/10 and about 400 mm/10 at 70° F. (21° C.).

23. A shortening according to claim 22 having a penetration between about 150 mm/10 and about 300 mm/10 at 70° F. (21° C.).

24. A shortening according to claim 3 having a beta-prime crystal morphology.

25. A shortening according to claim 24 wherein the hardstock has a beta-prime crystal morphology.

26. A shortening according to claim 3 having a polyol fatty acid polyester hardstock with an iodine value less than 12.

27. A shortening according to claim 3 having a triglyceride hardstock with an iodine value less than 12.

28. A plastic shortening comprising:
   (A) a solid polyol fatty acid polyester having a complete melting point above 37° C. wherein
      (i) the polyol is sucrose,
      (ii) the ester groups are comprised of (a) fatty acid radicals of $C_{18}$ mono- and/or diunsaturated fatty acid radicals, and (b) $C_{22}$ saturated fatty acid radicals at a molar ratio of a:b being from about 2 to about 6, and
  (iii) at least about 7 of the hydroxyl groups of the polyol are esterified with said fatty acid groups;
(B) a liquid nondigestible oil having a complete melting point below 21° C.;
(C) from 0% to about 65% by weight of a digestible oil having an iodine value between about 90 and about 130;
(D) from 0% to about 50% intermediate melting fraction triglyceride having an iodine value between about 35 and about 55;
(E) from 0% to about 20% by weight hardstock having an iodine value less than about 12; and
(F) from 0% to about 15% by weight other shortening ingredients;
wherein (i) the ratio of (A) to (B) is from about 1:99 to about 9:91, (ii) the shortening composition has a yield point more than about 100 dynes/cm$^2$, (iii) the overall slope of the SFC profile between 50° F. (10° C.) and 105° F. (41° C.) is between about 0.00 and about −0.20, and (iv) the penetration is between about 150 mm/10 and about 300 mm/10 at 70° F. (21° C.), (v) wherein the combined level of (A) and (B) is greater than 10%, (vi) at least 30% by weight of the fatty acid radicals in (A) are $C_{20}$ or higher saturated fatty acid radicals, and (vii) the slope of the SFC profile of the mixture of (A) and (B) between 37° C. and 21.1° C. is between 0 and about −0.5.

29. A food composition comprising:
(A) a solid polyol fatty acid polyester having a complete melting point above 37° C. wherein
  (i) the polyol has at least about 4 hydroxyl groups,
  (ii) the ester groups are comprised of (a) fatty acid radicals selected from the group consisting of $C_{12}$ or higher unsaturated fatty acid radicals, $C_2$–$C_{12}$ saturated fatty acid radicals, or mixtures thereof, and (b) $C_{20}$ or higher saturated fatty acid radicals at a molar ratio of a:b being from about 1:15 to about 1:1, and
  (iii) at least about 4 of the hydroxyl groups of the polyol are esterified;
(B) a liquid nondigestible oil having a complete melting point below about 37° C.;
(C) from 0% to about 90% by weight of a digestible oil having an iodine value between about 75 and about 150;
(D) from 0% to about 50% intermediate melting fraction triglyceride having an iodine value between about 25 and about 75;
(E) from 0% to about 20% by weight hardstock; and
(F) from 0% to about 15% by weight other shortening ingredients;
wherein the ratio of (A) to (B) is from about 1:99 to about 9:91, wherein the shortening composition has a yield point more than about 100 dynes/cm$^2$, wherein the combined level of (A) and (B) is greater than 10%, wherein at least 15% by weight of the fatty acid radicals in (A) are $C_{20}$ or higher saturated fatty acid radicals and wherein the slope of the SFC profile of the mixture of (A) and (B) between 37° C. and 21.1° C. is between 0 and about −0.75.

30. A food composition according to claim 29 wherein the solid polyol fatty acid of (A) has (i) from about 4 to about 8 hydroxyl groups and (ii) ester groups which consist essentially of (a) fatty acid radicals selected from the group consisting of $C_{12}$ to $C_{26}$ mono- and/or diunsaturated fatty acid radicals, $C_6$–$C_{12}$ saturated fatty acid radicals or mixtures thereof, and (b) $C_{20}$–$C_{26}$ saturated fatty acids at a molar ratio of (a) to (b) being from about 1:7 to about 4:4.

31. A food composition according to claim 30 wherein the polyol of part (A) is sucrose and the ratio of (a) fatty acid radicals:(b) fatty acid radicals is from about 1:7 to about 3:5.

* * * * *